United States Patent Office 3,780,184
Patented Dec. 18, 1973

3,780,184
FLAVORED OILS AND FOOD PRODUCTS CONTAINING THE SAME
James J. Broderick, River Edge, N.J., and Seymour A. Marcus, Brooklyn, N.Y., assignors to H. Kohnstamm Company, Inc., New York, N.Y.
No Drawing. Filed Mar. 15, 1971, Ser. No. 124,457
Int. Cl. A23l 1/26
U.S. Cl. 426—65           12 Claims

ABSTRACT OF THE DISCLOSURE

A method for the preparation of an edible oleophilic flavor composition which comprises reacting at a temperature of from about 175° F. to 450° F., a reaction mixture consisting of (1) an amino reactant selected from the group consisting of a sulfur-containing polypeptide, cysteine, cystine or salts thereof, (2) a ribonucleotide and (3) an edible oil, and recovering the flavor base reaction product derived therefrom.

BACKGROUND OF THE INVENTION

It has been suggested in the flavor art to react ribonucleotides with polypeptides, amino acids and sugars in the presence of water to develop reaction products which are useful food flavors. However, with the use of such products which conventionally contain a certain amount of entrapped and residual water flavor incompatibility problems arise if one seeks to flavor an essentially oleaginous material, such as a salad oil or salad dressing, or a solidified shortening such as lard or fat. Certain other oily flavored products which are added to edible compositions such as pet food, baked goods, bacon or either natural or synthetic meat products and in general any products which have been or are intended to be flavored with a meaty oily flavor product, also suffer from this disability. Essentially, these oils, fats and foods containing the same not only resist admixture of a water base flavor but, if so flavored, have a tendency to become rancid and deteriorate to the extent of the development of an off-flavor under normal conditions of storage but especially when the temperature is elevated even for a short period of time. Therefore, it would be of considerable value to the food industry to have available a synthetic flavor composition which, when prepared, is an essentially oleophilic material with a high level of storage stability which permits it to be stored at room temperature or above. As an additional requirement, such flavor composition should have a compatability with proteinaceous and starchy food products so that it is capable of quickly and universally distributing its flavor through the product it is intended to modify.

OBJECTS OF THE INVENTION

The present invention, therefore, has as its principal object the disclosure of a unique method of manufacture of an oil base flavor product which is entirely free of moisture and has a high level of stability. An additional object of the invention is to make available to the food processing industry a flavored oil which may be used by itself or as an additive to other food products. The following general description and several illustrative embodiments will explain in greater detail the nature of this invention.

BRIEF DESCRIPTION OF THE INVENTION

Accordingly, the present invention comprises a flavor composition consisting of the reaction product of an edible oil, a sulfur-containing polypeptide and one or a mixture of amino acids derived therefrom and a ribonucleotide or a natural product containing ribonucleotides.

The composition is prepared in the form of a flavor base for meat flavors which is most effective in a fat or oil medium. The flavor base has an intrinsic meat flavor and aroma but it can also be blended with other ingredients to form various types of meat and poultry flavors.

The present flavor compositions are novel in that they have no off-note tastes or aromas and are stable against deterioration and spoilage upon storage under proper conditions. The flavor components of the flavor bases are developed only during the reaction of the ingredients in oil or fat at elevated temperatures of the order of 360° to 400° F. preferably but the reaction will go even if it takes as long as 4 hours at temperatures as low as 240° F. Conversely, reaction at 450° F. will convert the reactants in a matter of minutes. The reaction proceeds in the absence of water and since one of the reactants is an oil the reaction medium has fluidity.

The reactant materials involved in the reaction may either be prepared synthetically or may in some cases result from reaction of a material which occurs in nature. The ribonucleotide reactant may be selected from a number of such materials such as inosinates, guanylates, or combinations of synthetic nucleotides with natural products which contain nucleotides of the ribose type. Particularly suitable reactants have been found to be the nontoxic salt of 5'-guanylate or 5'-inosinates or combinations of these such as disodium 5'-guanylate or 5'-inosinate or products rich in their content. The use of a yeast which contains natural ribonucleotides such as smoked torula yeast is included when it is desired to give a burnt or nutty character to the flavor base.

The amino reactant is preferably an amino acid selected from the group which includes cysteine or cystine or a sulfur-containing polypeptide such a glutathione. The reaction time used in the processing may range from one minute to 240 minutes depending upon the reaction temperature which will generally range from 175° F. to 450° F. The optimum temperature range was found to be 360 to 400° for a heating or reaction period of 2 to 15 minutes duration.

The oil component of the reaction mixture is an animal oil such as lard oil or a vegetable oil such as cottonseed oil or butter oil as is illustrated in the several examples. However, any one of several animal oils or vegetable oils such as shark oil, peanut oil, soy bean oil, hydrogenated vegetable oil and coconut oil to name a few may be employed to replace the animal and vegetable oils as shown in the several examples.

The optimum ratio of amino reactant to ribonucleotide to oily component is 1 part of amino reactant to 2.3 parts of ribonucleotide to 300 parts of fat or oil. A general range of such reactant is 1 part amine reactant to from 0.1 to 10.0 parts ribonucleotide to form 10 to 1000 parts of fat or oil. It has been found that with this range of reactants there is produced a flavor base having a roasted or nutty meat flavor.

The reaction which comprises the development of the present flavor material will generally take place in the absence of water. The flavor developing reaction may also take place in the presence of the food product in which the meat flavor is sought to be developed. In the particular instance the cystine or cysteine containing amino acid reagent and the ribonucleotide moiety will act as precursors in the reaction which ultimately will involve a reaction between the ribose moiety of the nucleotide, the amino acid component and the oily component. It must be understood that the nucleotide reactant may be added per se or a part of a natural product containing the same which will release the ribonucleotide in situ during the course of the reaction.

The flavor developing reaction may also take place in the presence of the food product in which the savory meat like flavor is sought to be developed. An example of the use of reaction products of this invention may be as part of a seasoning mixture added to various meat products where a supplementary meat flavor is desired. However, the flavor ingredient obtained by means of the reaction may be added to processed proteins which have no meat flavor of their own and in which a meat flavor is desired. A common use is in the canning industry to flavor food products that have been sterilized or autoclaved which may result in a loss of some of their natural flavor. Under these conditions the meat-like flavor is developed in the actual processing of the food product. There are also food products such as gravy mixes, soup mixes, salad oils and flavored baked products wherein the bases themselves or when compounded with other flavoring ingredients may be blended into naturally occurring or processed foods such as bread, crackers, processed meats, cheeses, sauces, soups or convenience foods. Such food products as dips, crackers, tidbits which are flavor or aroma deficient and which lack synthetically produced proteins or synthetically derived natural proteins may be produced into products which give savory comestibles of stable flavor character and acceptable taste level.

It is also within the broad concept of this invention that in addition to the basic reaction of an amino reactant, an oil and a ribonucleotide other side reactions may be made a part of the main reaction to develop supplementary flavor notes. For example, if one adds propionaldehyde to the reaction mixture after it has been cooled down to room temperature but prior to the completion of the reaction an anion or chive like flavor note is added. On the other hand, if valeraldehyde or isovaleraldehyde is added a bacon or roasted character is developed in the food or flavor product. Various amino acids such as glycine, alanine or arginine to name a few or protein hydrolyzates may be added as part of the reaction mixture to develop supplemental flavors. For instance, a small amount of methionine adds a beef-broth like note to the reaction mixture.

Known flavoring materials may be added to give particular flavors characteristic of the species of meat fat desired. For example, less than 1 p.p.m. of 2,4-decadienal or related aldehydes in the finished flavored product will give a poultry or pork fat character, cis 4-heptenal or related aldehyde will accentuate the beef fat characteristics. Spices, seasonings and other flavoring materials such as diacetyl, hexenal, trans 2-hexenal, methyl sulfide can be added to round off the flavor. Although the addition of aldehydes such as 2,4-decadienal and cis 4-heptenal are usually used at less than 1 p.p.m. in the finished flavored product, special or unusual flavoring problems may call for higher levels and this invention is not limited to these levels or the above-mentioned aldehydes. It is not the purpose of this invention to claim the use of these flavoring materials, which are part of the art of flavoring, as novel or unusual. We do claim that their addition to our basic invention will improve or make more practical the basic concept claimed as an invention.

The following examples will serve to illustrate the preferred mode of practice of the invention. It must, of course, be understood that the several examples set forth only serve to illustrate certain of the products and the method to produce them which are embraced within the total concept of the invention. It is believed, however, that the specific embodiments disclosed are sufficient to teach one how to practice the principles of the invention whose scope is defined by the several appended claims.

In the examples where specific quantities of reactants are not specified it is to be understood that they are present in parts by weight.

Example 1

A mixture of 6.5 g. disodium 5'-inosinate, 4.3g. of L-cysteine hydrochloride and 21.6 g. of hickory smoked torula yeast are added to 432 g. of stirred coconut oil at 370–375° C. The total heating time was eight minutes. The suspension while stirring was cooled to room temperature and the insoluble material removed by centrifugation or filtration to give a clear, golden brown liquid with a nutty or burned meat aroma and flavor.

Example 2

To 268 g. (240 ml.) of stirred, melted butter oil at 380–385° C. was added a ground mixture of 2.2 g. of L-cysteine hydrochloride monohydrate and 5.0 g. of disodium 5'-inosinate. Total heating time was seven minutes. Upon cooling down to 50°, the clear liquid was centrifuged or passed through cheese cloth to remove coarse particles and then allowed to solidify to a yellow brown semi-solid with a savory, roasted beef aroma and taste.

Example 3

To 300 g. of lard previously melted and heated to 380° F., add a ground mixture of 1.0 g. of L-cysteine hydrochloride and 2.0 g. of disodium 5'-inosinate. Heat further for one minute. Cool to 300° F. and add 1800 ml. wood smoke distillate. The mixture is shaken well and the oil layer separated. Salt, protein hydrolysates, additional flavoring materials can be added to the fat to prepare a completed bacon or smoked ham type flavor.

Example 4

A meat flavored salad dressing may be prepared by adding to a commercial salad oil used in salad dressings ⅜ of an ounce of the flavor reaction product of Example 3 above. The salad oil (olive oil) is admixed in amount of ⅖ gallon to ⅜ ounce of flavor. Then is added to this mixture ⅕ gallon of cider vinegar and ⅕ gallon of water.

Example 5

A dry gravy mix may be prepared by incorporating from 0.125 part to 0.25 part of the flavor reaction product of Example 2 to 100 parts of a dry beef gravy mix to enhance the flavor thereof.

Example 6

A flavored pet food may be prepared by adding 1 part of the flavor reaction product of Example 2 per 100 parts of Rival dog food. The product obtained has a strong beef flavor. Any moist or dried pet food can be substituted in the manner of this example.

Example 7.—Beef flavored extruded corn curls

A tasty beef flavored extruded corn curl type snack food can be prepared by admixing and extruding the following formulation:

| Ingredient: | Amount |
|---|---|
| Corn meal _____pounds__ | 100 |
| Flavored oil of Example 2 _____gallons__ | 10.5 |
| Salt _____pounds__ | 10.5 |
| Monosodium glutamate _____do____ | 2.75 |
| Hydrolyzed vegetable protein powder (Maggi #245, Nestles) _____ounces__ | 16.75 |

The above mix is fried to form a tasteful snack food.

Example 8.—Ham flavored extruded corn curls

| Ingredient: | Amount |
|---|---|
| Curls _____pounds__ | 100 |
| Flavored oil of Example 3 _____ gallons__ | 10½ |
| Salt _____pounds__ | 10½ |
| Monosodium glutamate _____do__ | 2¾ |
| Hydrolyzed vegetable protein _____ounces__ | 16¾ |

A tasty ham flavored extruded corn curl type snack food can be prepared by admixing and extruding the above formulation.

Example 9.—Bacon flavored extruded corn curls

| Ingredient: | | Amount |
|---|---|---|
| Curls | pounds | 100 |
| Flavored oil of Example 3 | gallons | 10½ |
| Salt | pounds | 10½ |
| Monosodium glutamate | do | 12¾ |
| Casein hydrolyzate | ounces | 11¼ |

A tasty bacon flavored extruded corn curl type snack food can be prepared by admixing and extruding the above formulation.

For testing purposes curls can be heated at 325° F. for five minutes and then tossed with flavored oil. Commercially the flavored oil is added to the warm curls immediately after the baking step. The mixed dry ingredients are also added in this operation which is discontinued when the curls are thoroughly coated. Evaluation best made after 24 hours.

We claim:

1. A method for the preparation of an edible oleophilic flavor composition which comprises reacting at a temperature of from about 175° F to 450° F., a reaction mixture consisting of (1) an amino reactant selected from the group consisting of a sulfur-containing polypeptide, cysteine, cystine or salts thereof, (2) a ribonucleotide and (3) an edible oil, and recovering the flavor base reaction product derived therefrom.

2. A method for the preparation of an edible oleophilic flavor composition according to claim 1 wherein the amino acid member is cysteine and the ribonucleotide is disodium 5′-guanylate.

3. A method according to claim 1 wherein the edible oil is coconut oil.

4. A method according to claim 1 wherein the edible oil is lard oil.

5. A method according to claim 1 wherein the reaction time is from 2 to 15 minutes at a reaction temperature range of 360 to 400° F.

6. An edible oleophilic flavor composition according to claim 5 wherein amino compound reactant is cysteine.

7. An edible oleophilic flavor composition according to claim 5 wherein the ribonucleotide reactant is a 5′-ribonucleic acid salt.

8. A method for the preparation of an edible eleophilic flavor composition which comprises reacting at a temperature of from about 175° F to 450° F., a reaction mixture consisting of (1) from about 0.5 to 2.0 parts by weight of an amino reactant selected from the group consisting of a sulfur-containing polypeptide, cysteine, cystine salts thereof, (2) from about 0.1 to 10.0 parts by total weight of a ribonucleotide and (3) from 10 to 1,000 parts by total weight of an edible oil, and recovering the flavor base reaction product derived therefrom.

9. A method for the preparation of an edible oleophilic flavor composition according to claim 8 wherein the ribonucleotide is a 5′-ribonucleic acid salt.

10. A method for the preparation of an edible oleophilic flavor composition according to claim 9, wherein the 5′-ribonucleic acid salt is disodium 5′-guanylate.

11. A method for the preparation of an edible oleophilic flavor composition according to claim 9, wherein the 5′-ribonucleic acid salt is disodium 5′-inosinate.

12. An edible oleophilic flavor composition consisting of a reaction product of (1) an edible oil, (2) an amino compound selected from the group consisting of a sulfur-containing polypeptide, cysteine, cystine and salts thereof and (3) a ribonucleotide.

References Cited

UNITED STATES PATENTS

| 3,519,437 | 7/1970 | Giacino | 99—140 |
|---|---|---|---|
| 3,365,306 | 1/1968 | Perret | 99—140 |
| 3,493,395 | 2/1970 | Soeters | 99—140 |
| 3,532,514 | 10/1970 | May | 99—140 |
| 3,532,515 | 10/1970 | Broderick et al. | 99—140 |
| 3,578,465 | 5/1971 | Van der Zijden | 99—140 |
| 3,615,698 | 10/1971 | Thomas | 99—140 N |

MORRIS O. WOLK, Primary Examiner

S. MARANTZ, Assistant Examiner

U.S. Cl. X.R.

260—112.5, 211.5 R, 583 EE